Patented July 7, 1953

2,644,802

UNITED STATES PATENT OFFICE 2,644,802

TETRAFLUOROETHYLENE POLYMER COMPOSITIONS CONTAINING POLYORGANOSILOXANE LUBRICANTS

John Frank Lontz, Nutley, N. J., assignor to E. I. du Pont de Nemours and Company, Wilmington, Del., a corporation of Delaware No Drawing. Application June 30, 1950,
Serial No. 171,532

5 Claims. (Cl. 260—29.1)

This invention relates to new compositions comprising coagulated tetrafluoroethylene polymer and polyorganosiloxane lubricants.

It has been previously proposed to prepare finely divided polytetrafluoroethylene dispersed in various organic media as well as in aqueous suspensions. Although highly valuable and usable, these previously known forms of polytetrafluoroethylene and compositions prepared therefrom have not been entirely satisfactory for extrusion and coating applications. Moreover, the previously known methods for shaping polytetrafluoroethylene at temperatures above its sintering temperature, in many instances, resulted in the development of flaws and fractures in the shaped products, and required long processing cycles.

It is, therefore, an object of this invention to provide new compositions based on tetrafluoroethylene polymer which are readily adapted to be extruded, coated, calendered, and molded. Another object is to provide new and useful lubricated polytetrafluoroethylene compositions in the form of a dry molding powder and methods for preparing same. Other objects will be apparent from the description of the invention given below.

The above objects are accomplished according to this invention by the provision of non-aqueous pressure-coalescing compositions comprising colloidal particles of tetrafluoroethylene polymer, which in particular embodiments have been co-agulated from an aqueous colloidal suspension of the polymer, intimately admixed with a liquid polyorganosiloxane, the quantity of which is generally from 5% to 50% of the combined weight of said tetrafluoroethylene polymer and polyorganosiloxane. The polyorganosiloxanes which are used in practicing this invention are characterized in that they contain recurring structural units of the formula

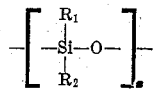

The nature of the end groups, in particular embodiments, may be such that the structure can be represented as follows:

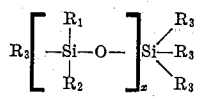

In the above formulae $R_1$ and $R_2$ are from the group consisting of the same or different alkyl and aryl radicals, and $x$ is a number greater than 2. $R_3$ may be varied very widely, and may, for example, be an alkyl or aryl group, or even hydrogen, or other group capable of terminating a polymer chain. It is to be understood that the recurring units need not all be identical; for example the polyorganosiloxane may be an interpolymer derived from dimethyl silanediol and diphenyl silanediol in which case $R_1$ and $R_2$ may be methyl groups in some of the recurring units, and phenyl groups in other recurring units. It is to be understood also that the invention is not restricted to the use of polyorganosiloxanes having specific end groups, and that the polyorganosiloxanes may in certain instances have a closed ring structure. The polyorganosiloxanes which are employed have a viscosity of 0.45 to 1000 centipoises at 25° C., preferably between 20 and 500 centipoises at 25° C. The preferred proportion of polyorganosiloxane varies from 15% to 30%, based upon the combined weight of tetrafluoroethylene polymer and polysiloxane. The invention also comprises the preparation of the above non-aqueous compositions by coagulating an aqueous colloidal suspension of polytetrafluoroethylene in the presence of said polyorganosiloxane.

Whereas the invention will be described chiefly with respect to polytetrafluoroethylene (i. e., tetrafluoroethylene homopolymer), it is to be understood that the invention also applies to other tetrafluoroethylene polymers. Thus, tetrafluoroethylene copolymers comprising the polymerization product of a mixture of tetrafluoroethylene and another unsaturated organic compound (e. g., ethylene and chlorotrifluoroethylene) containing a terminal ethylenic double bond, said organic compound being copolymerizable with tetrafluoroethylene and being present in said mixture in an amount of up to 15% of the combined weight of tetrafluoroethylene and said organic compound, may be employed in place of polytetrafluoroethylene, provided the presence of the other compounds do not destroy the essential and characteristic qualities of the colloidal particles. Also there may be employed tetrafluoroethylene polymers in which the end groups of the polymer chain are supplied by non-polymerizable compounds (e. g., methanol and ethanol) which are present during the polymerization reaction. The term "tetrafluoroethylene polymer" as used herein covers the above three types of polymers, it being understood that all the tetrafluoroethylene polymers of this invention possess a high degree of polymerization and a sintering temperature of at least 300° C. Above the sintering temperature such polymers form a gel but they do not actually melt to a liquid. This is in contrast to the known relatively low molecular weight polymers derived from tetrafluoroethylene and certain tetrafluoroethylene polymer waxes, both of which have sharp melting points.

The compositions of this invention are, in general, thoroughly dry (i. e., non-aqueous) and vary from putty-like masses to pulverulent solids, depending upon the amount and type of polyorganosiloxane employed. The compositions as prepared are suitable for directly extruding, calender-rolling, coating, molding or otherwise fabricating into finished articles without any further special treatment.

The following examples illustrate specific embodiments of this invention. All parts are by weight unless otherwise specified, and all aqueous colloidal polymer suspensions were prepared as described in U. S. application Serial No. 107,137, filed July 27, 1949, by K. L. Berry, now forfeited. The latter application discloses the polymerization of tetrafluoroethylene at 0° to 100° C. in an aqueous medium in the presence of a water-soluble polymerization catalyst such as disuccinic acid peroxide, i. e., $(HOOCCH_2CH_2COO)_2$, and an alkali metal or ammonium salt of an acid of the formula $H(CF_2CF_2)_3$ to $10COOH$. These acids are obtainable by oxidizing, with a permanganate oxidizing agent, a polyfluoroalkanol of the formula $H(CF_2CF_2)_3$ to $10CH_2OH$. The latter compounds are in turn formed by polymerization of tetrafluoroethylene in the presence of methanol and an organic peroxide catalyst at a temperature between 75° C. and 350° C., as disclosed in U. S. application Serial No. 65,063, filed by R. M. Joyce on December 13, 1948, now Patent Number 2,559,628.

Example I

Twenty-five parts of polymethylsiloxane (known commercially as silicone fluid DC–500, having a viscosity of 47 centipoises at 25° C. and a boiling point greater than 250° C. at 0.5 mm. Hg) is dissolved in 400 parts acetone. To this is added 75 parts of dried coagulated polytetrafluoroethylene, obtained by vigorously stirring an aqueous colloidal suspension of the polymer and filtering and drying the coagulated polymer at 110° C. The resulting slurry is stirred vigorously for 3 minutes in a Waring blendor. The acetone is then removed by evaporation on a steam bath, giving a dry molding powder.

The molding powder is fed to an 8-inch calendering roll (Thropp mill) to form a thin, transparent sheeting or film. In order to coalesce the polymer particles and to remove the lubricant, the film is then baked at 350° C. for one hour, giving a tough sheeting similar in properties and appearance to polytetrafluoroethylene made by high-pressure molding. The film is suitable for use as a dielectric insulation for such electrical components as cables, coils, armatures, etc.

Example II

Twenty-five parts of poly(methyl, phenyl(siloxane (known commercially as silicone fluid DC–702, having a viscosity of 30 centipoises at 25° C. and a boiling point of 400° C. at 760 mm. Hg) is mixed with 400 parts acetone and 75 parts of dried polytetrafluoroethylene obtained by coagulating an aqueous colloidal suspension of the polymer. Treatment of this slurry as in Example I yields a soft, white cake of the lubricated polymer.

The lubricated cake is next fed to an 8-inch calendering roll (Thropp mill) to form a transparent sheeting or film. In order to coalesce the polymer particles and to remove the lubricant, the film is then baked at 350° C. in a Watson-Stillman press leaving a tough sheeting similar in properties and appearance to that made by high-pressure molding of unlubricated polytetrafluoroethylene. The sheetings are easily welded or fused together by simply making ordinary lap joints from two or more sections and then heating above the sintering temperature (327° C.) in between two metal retaining plates.

Example III

Five parts of the same polymethylsiloxane as used in Example I is mixed with 500 parts of acetone and 95 parts of dried coagulated polytetrafluoroethylene, as described in Example I. The resulting lubricated polymer, freed of acetone, is a soft, white cake.

The lubricated cake is next fed to an 8-inch calendering roll (Thropp mill), heated to a temperature range of 200–210° C. to form a thin transparent sheeting whose thickness varies from 0.0145 inch to 0.004 inch depending upon the adjustment of the rolls. This sheeting has in its unfused form an unusual toughness and it is transformed to a fused, still tougher sheeting by baking at 350° C.

Example IV

Fifteen parts of polymethylsiloxane (known commercially as silicone fluid DC–200, having a viscosity of 340 centipoises at 25° C.) is mixed in a Waring blendor with an aqueous colloidal suspension of polytetrafluoroethylene, containing 85 parts of polymer. The mixture is agitated until coagulation of the polymer is complete, giving a soft white lubricated polymer after drying at 110° C.

The dried lubricated polymer is rolled at room temperature between a pair of 16-inch rolls forming a thin sheeting with an average thickness of 0.008 inch. This sheet is baked at 327° to 340° C. for 30 minutes to a tough coherent film suitable for use as a dielectric insulator.

Example V

One hundred twenty-five parts of a 60% solids aqueous colloidal suspension of polytetrafluoroethylene (75 parts polymer and 50 parts water) is extended with 167 parts distilled water. To this is added 25 parts of the same polymethylsiloxane as used in Example IV. The resulting mixture of aqueous polymer suspension and liquid polymethylsiloxane is whipped to an emulsion in a Waring blendor while a mixture of 83 parts water and 66 parts acetone is added to coagulate the dispersed polymer. After approximately 3 minutes of agitation following the completed addition of the aqueous acetone, the lubricated coagulated polymer is filtered under strong suction and dried at 110° C. to expel any occluded water.

For filament extrusion, the dried lubricated polymer is placed in an extrusion chamber fitted with an hydraulically operated piston which forces the lubricated polymer through a circular die tapered to 0.010 inch opening. To facilitate rapid extrusion, the die is heated to 150° C. With an applied force of 4,000–6,000 pounds on a 1.25-inch diameter ram, a continuous monofilament is obtained at rates from 5 to 10 feet per minute. For maximum strength, the filament is further fused by passing through a sintering chamber electrically heated to 350–380° C., giving a tough, transparent filament which can be cold drawn at least four times its original length.

Example VI

A lubricated polymer composition is prepared by the same procedure as that described in Example V, except poly(methyl, phenyl)siloxane (known commercially as silicone fluid DC-703, having a viscosity of 63.2 centipoises at 25° C. and a boiling point of 450° at 760 mm. Hg) is substituted for the polymethylsiloxane.

For coating on a conducting wire, the dried lubricated polymer is placed in an extrusion chamber provided with an hydraulically operated piston and connected to a crosshead extrusion die through which a No. 14 AWG copper wire is introduced at a 40-degree angle. A coating with a wall thickness of 0.015-inch is extruded on the wire at ambient temperatures at rates of four to five feet per minute at a force of 1,000-2,000 pounds on a 1.25-inch diameter hydraulic ram. The resulting smooth, white coating is then freed of the lubricant by immersing in acetone as an extracting solvent, by which method the lubricant can be recovered for reuse in making up additional quantities of the lubricated polymer. The lubricant-free coating which is porous and somewhat fibrous in structure is then fused to a tough and tight covering by passing the wire through an oven heated to 360° C. Such a wire coating has all the dielectric qualities of fused polytetrafluoroethylene made by other fabricating methods.

The tetrafluoroethylene polymer for use in this invention may be obtained by coagulating an aqueous colloidal suspension of the polymer. It has been found that other finely divided forms of polytetrafluoroethylene, such as the granular form obtained by direct polymerization in accordance with U. S. P. 2,230,654; 2,393,967; and 2,394,243; the micro-pulverized form; or any other form which has been mechanically subdivided from the massive polymer cannot readily be extruded or molded under pressure to yield satisfactory articles. For example, when the granular form of polytetrafluoroethylene, prepared according to the above patents and then micro-pulverized to small particles, is mixed with polymethylsiloxane oil (85% polymer, 15% polymethylsiloxane), the preferred polysiloxane of this invention, the mixture extrudes as shreds with no continuity. Similarly, a mixture of 37.5% of the same granular polytetrafluoroethylene, 37.5% polytetrafluoroethylene coagulated from an aqueous colloidal suspension according to this invention, and 25% polymethylsiloxane oil fails to extrude on a No. 14 AWG wire except as broken shreds. The polymethylsiloxane actually exudes from the mixtures upon application of slight pressure. The granular polymer/polysiloxane mixture is quite different from the corresponding coagulated polymer/polysiloxane mixture in that the former shows no pressure-coalescing property when pressed on a flat surface, whereas the pressure-coalescing property is characteristic of the latter composition.

The process of preparing the aqueous suspension of tetrafluoroethylene polymer is not the subject of this invention. However, suitable aqueous suspensions of polytetrafluoroethylene may be obtained by the methods described in U. S. Serial No. 713,385, filed November 30, 1946, by M. M. Renfrew, now Patent Number 2,534,058; U. S. Serial No. 107,137, filed July 27, 1949, by K. L. Berry, now forfeited; and U. S. Patent 2,478,229. Aqueous suspensions of tetrafluoroethylene polymers in which the end groups of the polymer chain are supplied by non-polymerizable compounds may be obtained by the same method as that described for the preparation of the polytetrafluoroethylene suspension as typified by Batch D of Example X in U. S. Serial No. 107,137, filed July 27, 1949 by K. L. Berry, except that, for example, 0.075 part of methanol as the non-polymerizable compound is added with the other reactants to the pressure vessel prior to polymerization. The particle size of the polymer evidently is rather highly critical, i. e. it should be colloidal before coagulation, and the smaller the particles the more easily the lubricated composition may be fabricated into articles. The particle size of the polymer in the suspensions described in the above-mentioned applications and patent in general ranges from 0.05 to 5 microns, which is the diameter of average particle determined by an electron microscope measurement on a dried film obtained by depositing a highly diluted aqueous suspension of the polymer on a surface. These colloidal suspensions have been found quite suitable for coagulation in preparing the compositions of this invention. The colloidal particles of polytetrafluoroethylene retain their particulate form during coagulation although agglomeration may occur to some extent, whereby individual particles attach themselves to other particles without necessarily losing their identity, but this does not affect their ability to be fabricated when combined with the polysiloxanes of this invention. The coagulated mass is thus a characteristic physical form of the polytetrafluoroethylene. Moreover, polytetrafluoroethylene is virtually insoluble in practically all known solvents, and therefore the particles do not coalesce when merely suspended in organic media. To coalesce the particles in the composition of this invention it is necessary to subject them to the action of heat and/or pressure. The colloidal particles possess marked adsorptive properties, and can be employed as adsorbents for the polyorganosiloxanes of this invention. In this respect the colloidal form of polytetrafluoroethylene differs from other finely divided forms of the polymer.

The polyorganosiloxane for use in this invention should have certain viscosity characteristics. The viscosity of the polysiloxane and to some extent the lubricity influences the fabrication of the colloidal polytetrafluoroethylene, especially when subjected to pressure such as in extrusion and molding operations. The lubricity of the polysiloxane is related to the molecular weight, which in turn is related to the viscosity. For example, when the polyorganosiloxane is too fluid and has a viscosity at 25° C. of less than 0.45 centipoise, the composition will not produce uniform extruded articles at satisfactory rates. In fact, when pressure is applied to mixtures of colloidal polytetrafluoroethylene and polyorganosiloxanes having a viscosity of less than 0.45 centipoise at 25° C., the mixtures actually show marked exudation of the lubricant. This results in poor continuity of extrusion, and produces articles having irregular shapes, fissures, and non-uniform caliper. Hence, the polyorganosiloxane must have a viscosity at 25° C. of at least 0.45 centipoise and usually not greater than 1,000 centipoises. Generally the boiling points of these polysiloxanes vary from 150° C. to 500° C. at atmospheric pressure, although they may be higher, but in many cases cannot readily be determined because of further polymerization on heating. The most suitable polysiloxanes for extrusion applications are the polyalkylsiloxanes having a viscosity between 20 and 500 centipoises at 25° C. The polymers employed usually contain individual molecules in which $x$, in the formula given hereinabove, may be varied. The average molecular weight of the polymers may be controlled by changing the conditions of polymerization during preparation of the polyorganosiloxanes as is well known in the art, and for use in this invention the value of $x$ is selected to give polyorganosiloxanes having a viscosity of from 0.45 to 1,000 centipoises at 25° C. Examples of suitable polyorganosiloxanes include polymethylsiloxane, polyethylsiloxane, polyphenylsiloxane, polyisobutylsiloxane, poly(methyl, phenyl)siloxane, poly(ethyl, phenyl)siloxane, poly(phenoxyphenyl)siloxane, poly(chlorinated diphenyl)siloxane, and the like. It will be understood that the expression "poly(methyl, phenyl)siloxane," as employed herein, means that $R_1$ and $R_2$ may both be methyl in some of the recurring units and may both be phenyl in other recurring units of the polymer molecule, and also that $R_1$ and $R_2$ may be methyl and phenyl, respectively, in the same unit.

The preparation of the above polyorganosiloxanes is now well known in the art of silicone chemistry. A general review of these polyorganosiloxanes (which are also referred to in the literature as polymeric silicones) is described by Rochow, "Chemical & Engineering News," volume 23, page 612 (1945). Other references which describe the preparation of specific polyorganosiloxanes include, for example, U. S. P. 2,258,218 on the preparation of polymethylsiloxane (also known as polymeric methyl silicone) and U. S. P. 2,258,222 on the preparation of poly(methyl, aryl)siloxanes such as poly(methyl, phenyl)siloxane.

The proportion of polysiloxane in the compositions is as critically important as the viscosity of the polysiloxane. Compositions containing more than 50% polysiloxane are generally too fluid to permit coalescing the particles by the action of pressure, and for such forming operations as extrusion, calendering, and molding less than 50% of the polysiloxane is generally used. This means the flow of the composition cannot be controlled under pressure to give accurate tolerances in the fabricated articles when the polysiloxane content is too high. Furthermore, more than 50% polysiloxane presents uneconomic disadvantages in the removal of the polysiloxane lubricant. Less than 5% polysiloxane is ineffective in producing sufficient lubrication of the polymer for extruding or otherwise fabricating articles at commercially satisfactory rates. It is preferred to use from 15% to 30% of the liquid polysiloxane since these proportions yield compositions which possess optimum properties for processing into various articles by extruding, molding, calendering, coating, and the like. All percentages of polysiloxane are based on the combined weight of dry tetrafluoroethylene polymer and polysiloxane in the composition.

The compositions of this invention may be prepared by a variety of methods. One such method comprises intimately mixing the liquid polysiloxane oil with an aqueous suspension of colloidal polytetrafluoroethylene under high speeds of agitation with or without a dispersing agent, followed by coagulation accomplished by the addition of either an electrolyte or a water-miscible organic liquid such as acetone or alcohol. In this method it is preferred to use one of the many suitable dispersing agents disclosed in U. S. Patent 2,478,229. An equally satisfactory method for obtaining the composition involves coagulating an aqueous suspension of colloidal polytetrafluoroethylene, drying the coagulated polymer, suspending the coagulated polymer in an organic liquid vehicle, examples of such media being methanol and tertiary butanol; the polysiloxane is then added and dispersed in the medium with continuous stirring, followed by filtering or evaporation of the suspending vehicle. A third method comprises spraying a mist of the polysiloxane onto the dry coagulated polymer particles while the particles are being tumbled in a blender. A fourth method employs high speed agitation of the coagulated dried colloidal polymer in the presence of the polysiloxane. The only requirement for preparing satisfactory compositions is to thoroughly and intimately disperse the polysiloxane throughout the particles of the coagulated polymer.

Other materials may be incorporated in the compositions of this invention depending upon the properties desired in the finished articles fabricated from the compositions. Thus, is has been found that finely divided solid fillers, pigments, dyes, other lubricants (e. g., hydrocarbon oils and waxes, high-boiling esters such as dibutyl phthalate and tricresyl phosphate, naturally occurring low-melting waxes, and fluorinated hydrocarbon oils, all of which should have a viscosity of 0.45 to 1,000 centipoises at 25° C.), plasticizers and the like may be added to the compositions in varying amounts. Examples of suitable fillers and pigments which may thus be employed include carbon black, graphite, mica, talc, silica, asbestos, and titanium dioxide. All of these fillers and pigments should be in finely divided form and preferably should be of the approximate particle size of the polymer used in the mixture. The fillers and pigments may be employed in amounts varying from relatively small amounts up to as much as 400%, based on the dry weight of the tetrafluoroethylene polymer in the composition. All of these additional modifiers may be incorporated into the composition at any time prior to fabrication into the finished article. The fillers and pigments serve either to color the polymer or to extend and reinforce the polymer, resulting in mixtures having increased elongation in some cases and in mixtures having a lower cost where a cheap filler is selected. However, if the best electrical properties inherent in the polytetrafluoroethylene are desired, it will generally not be practical to employ large amounts of these other additives.

The chief advantage of this invention is that the polytetrafluoroethylene compositions may readily be extruded at relatively low temperatures (i. e., at 15° C. to 150° C. and higher, if desired) under compacting pressure into various shapes at rates up to approximately 50 feet per minute, whereas prior to this invention melt extrusion rates were limited to approximately 50 feet per hour at much higher temperatures. These extruded shapes may be freed from the polysiloxanes by either volatilizing or extracting with a solvent, although the boiling points of the polysiloxanes are so high, they will generally be extracted before the polytetrafluoroethylene is sintered. Following removal of the polysiloxane the shaped article is baked at a temperature above 327° C. until sintered, and thereafter either annealed or quenched. The processing conditions for extruding articles from lubricated polytetrafluoroethylene are more fully described in U. S. Serial No. 171,534 of Llewellyn and Lontz, filed June 30, 1950.

Another advantage of this invention is that the compositions provide a means for molding polytetrafluoroethylene at temperatures as low as room temperature and above into useful articles, following which the polysiloxane may be removed as above and the article finally sintered at a temperature above 327° C. Still, another advantage of the compositions of this invention lies in the fact that they may be calendered over asbestos, paper, cloth, foil and the like, following which the polysiloxane may be removed as above and the extruded article sintered at a temperature above 327° C. if desired. For example, the composition may be coated by spreading, by using a doctor knife, or by rolling the composition onto supporting structures such as asbestos cloth, webbing, boards, porous ceramic surfaces, glass cloth, metal screens, and the like.

The compositions of this invention are useful for extrusion into various forms such as filaments, beading, films, sheets, tubes, rods, tapes; extrusion coatings on wires, calender rolling into sheets; coating and calendering over paper, cloth, foil, and the like; and for molding into various articles. Another particularly suitable application involves use of the compositions for bonding or repairing sections of polytetrafluoroethylene film or sheeting. For example, several sections of an unbaked, unsintered sheet extruded from one of the lubricated polymer compositions of this invention have been lapped and securely bonded to give satisfactory bonds.

Another application for the compositions of this invention involves a simplified method for joining spliced sections of polytetrafluoroethylene coated wire conductors. This method involves the steps of wrapping the spot to be spliced with one or more layers of unsintered lubricated polytetrafluoroethylene tape extruded from one of the lubricated compositions of this invention, and thereafter heating the resulting assembly above 327° C. to sinter the whole and effect bonding to the conductor and its coating. The same wrapping technique may be applied to the covering of other metal articles such as iron magnets, coils, and the like, where it is desired to cover the article with a chemically inert, corrosion-resistant, electrical insulating covering.

I claim:

1. A non-aqueous pressure-coalescing composition which comprises coagulated tetrafluoroethylene polymer particles of colloidal size intimately admixed with a liquid polyorganosiloxane consisting essentially of recurring units of the formula

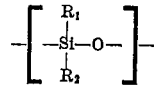

$R_1$ and $R_2$ being of the class consisting of methyl and phenyl groups, said polyorganosiloxane being present in an amount equal to from 5% to 50% of the combined weight of tetrafluoroethylene polymer and polyorganosiloxane, said polyorganosiloxane having a viscosity of within the range of from 0.45 to 1,000 centipoises at 25° C.

2. The composition of claim 1 in which the said polyorganosiloxane is poly(methyl, phenyl) siloxane.

3. The composition of claim 1 in which $R_1$ and $R_2$ are methyl groups.

4. The composition of claim 1 in which the viscosity of the polyorganosiloxane is from 20 to 500 centipoises at 25° C.

5. The composition of claim 1 wherein the tetrafluoroethylene polymer is polytetrafluoroethylene homopolymer.

JOHN FRANK LONTZ.

References Cited in the file of this patent

UNITED STATES PATENTS

| Number | Name | Date |
|---|---|---|
| 2,090,617 | Bley | Aug. 24, 1937 |
| 2,478,229 | Berry | Aug. 9, 1949 |
| 2,484,483 | Berry | Oct. 11, 1949 |
| 2,520,173 | Sanders | Aug. 29, 1950 |
| 2,527,793 | Bump | Oct. 31, 1950 |

OTHER REFERENCES

Dow Corning Silicone Notebook Fluid Series No. 3, Sept. 1948, pp. 8 and 9. Copy in Div. 50.